Feb. 13, 1973  V. MUSILEK  3,716,635
ANTIFUNGAL ANTIBIOTIC OBTAINED FROM BASIDIOMYCETE OUDEMANSIELLA
MUCIDA AND PROCESS OF MAKING THE SAME
Filed Aug. 4 1970  3 Sheets-Sheet 1

INVENTOR
VLADIMIR MUSILEK

ATTORNEY

United States Patent Office 3,716,635
Patented Feb. 13, 1973

3,716,635
ANTIFUNGAL ANTIBIOTIC OBTAINED FROM
BASIDIOMYCETE OUDEMANSIELLA MUCIDA
AND PROCESS OF MAKING THE SAME
Vladimir Musilek, Prague, Czechoslovakia, assignor to
Ceskoslovenska Akademie Ved, Prague, Czechoslovakia
Continuation-in-part of applications Ser. No. 600,046,
Dec. 8, 1966, and Ser. No. 698,353, Jan. 16, 1968. This
application Aug. 4, 1970, Ser. No. 60,903
Claims priority, application Czechoslovakia,
Dec. 17, 1965, 7,592/65
Int. Cl. A61k *21/00;* C12b *1/00;* C12d *9/00*
U.S. Cl. 424—122                                    11 Claims

ABSTRACT OF THE DISCLOSURE

Antifungal antibiotic obtained by fermentation of a culture of basidiomycete *Oudemansiella mucida* (Schrad. ex. Fr.) Höhn. The antibiotic has the empirical formula $C_{16}H_{18}O_3$, the molecular weight of 258 and a melting point between 51 and 53° C.

The antibiotic is effective against numerous fungi including Dermatophytes, Phycomycetes, Fungi Imperfecti and Ascomycetes.

The antibiotic is produced by subjecting the culture above identified to fermentation in a liquid fermentation medium containing sources of assimilable carbon and nitrogen at a temperature between 15 and 30° C. and a pH between 3 and 7 followed by extraction and recovery of the antibiotic from the concentrate obtained from the extract.

The oily concentrate obtained as an intermediate product also can be used as an antifungal antibiotic composition.

CROSS-REFERENCES TO RELATED APPLICATIONS

This application is a continuation-in-part of application Ser. No. 600,046, filed by the same inventor on Dec. 8, 1966 in respect of "Method of Preparation of Culture for the Production of a New Antifungal Antibiotic" and application Ser. No. 698,353 likewise filed by the same inventor, filing date Jan. 16, 1968 in respect of "Antifungal Antibiotic" both of these applications now abandoned.

BACKGROUND OF THE INVENTION

Comparatively few antifungal antibiotics are available. The principal representatives of this group produced by fermentation are only two compositions. One is fungicidin, which is produced by actinomycete *Streptomyces noursei* (U.S. Pat. No. 2,797,183); the other is griseofulvin, which is produced by the fungus *Pennicillium griseofulvum* (British Pat. 784,618).

Both compositions are usually applied orally. For external application fungicidin is usually employed in the form of a special ointment or talcum powder.

In view of the limited number of available antifungal antibiotics and the possibility of formation of resistant pathogenic microorganisms, it appears highly desirable to obtain another type of antifungal antibiotics. This is accomplished by the present invention.

SUMMARY OF THE INVENTION

The antifungal antibiotic of the present invention is obtained by fermentation of a culture of basidiomycete *Oudemansiella mucida* (Schrad. ex Fr.) Höhn. The antibiotic has the following characteristics:

emprical formula: $C_{16}H_{18}O_3$
molecular weight (established by mass spectrography): 258
melting point: 51–53° C.
optical activity: +3.3° (c 10 at 546 m$\mu$ in benzene)
infrared and ultraviolet spectra: as shown in FIGS. 2 and 3

The invention also comprises the process of producing the antibiotic by subjecting a culture of basidiomycete *Oudemansiella mucida* (Schrad. ex Fr.) Höhn to fermentation in a liquid fermentation medium at a temperature between 15 and 30° C. and a pH between 3 and 7, forming an extract from the fermented mass in the form of an oily concentrate and recovering the antibiotic therefrom by chromatographic methods, distillation or both steps in succession.

The invention also embraces the oily concentrate obtained as an intermediate product in the production of the pure antibiotic, the concentrate also having valuable antifungal antibiotic properties.

Figure 1A:
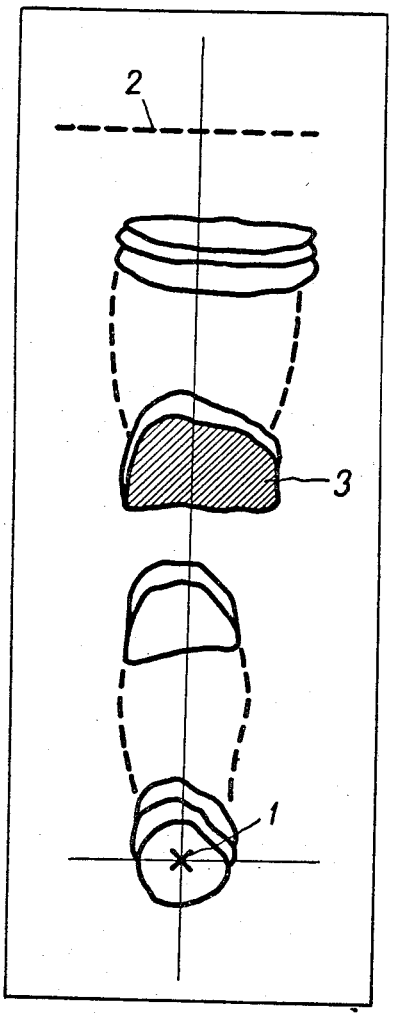
FIG. 1a is a thin-layer chromatogram of the raw concentrate on $Al_2O_3$.

The most significant absorption peaks are—IR region: 695, 752, 768, 971, 1075, 1117, 1146, 1242, 1437, 1458, 1623, 1713 cm.$^{-1}$. UV region: 211, 229, 237, 292 m$\mu$.

DETAILED DESCRIPTION OF THE INVENTION AND PREFERRED EMBODIMENTS

The organism by which the antibiotic of the present invention is produced, the basidiomycete *Oudemansiella mucida* (Schrad. ex Fr.) Höhn is known under various synonyms listed in R. Singer: The Agaricales in modern taxonomy. E. J. Cramer, Weinheim, 1962, as follows: *Armillaria mucida*, Kummer, *Collybia mucida* Quel. Lepiota mucida Schröder, *Mucidule mucida* Pat.

From the taxonomical point of view, the basidiomycete *Oudemansiella mucida* (Schrad. ex Fr.) Höhn belongs to the order of Agaricales, family Tricholomataceae, tribus Marasmieae, subtribus Oudemansiellinae; see the cited publication by Singer.

The appearance and the occurrence of the natural fruiting body of this mushroom has been described in the publication by Singer and, furthermore, by Cartwright and Findlay (K.S.G. Cartwright, W.P.K. Findlay: Decay of timber and its prevention. His Majesty's Stationary Office, London 1946).

The basidiomycete *Oudemansiella mucida* (Schrad. ex Fr.) Höhn is actually a widespread macromycete, not a microorganism in the common sense. Only the microscopic mycelial growth phase of this organism may be considered a microorganism. The fruiting bodies of the organism can be found in numerous natural localities summarized in the cited monograph by Cartwright and Findlay.

For the purpose of the present invention a pure culture of the basidiomycete Oudemansie-lamucida (Schrad. ex Fr.) Höhn may be grown in a submerged culture, for instance at a temperature between 15 and 30° C. for 6–8 days in a liquid medium containing as sources of assimilable carbon and nitrogen, for instance, carbohydrates, lipids, amino acids, ammonium salts, nitrates or raw materials containing these compounds. Preferably, there are present also nutrient mineral salts such as sulfates, chlorides, phosphates, iodides, borates and/or carbonates of calcium, sodium, potassium or magnesium, zinc, copper, cobalt, manganese, ferric or ferrous iron.

The sources of carbon and nitrogen are preferably applied at concentrations up to 15%, the nutrient salts at concentrations up to 5%, the percentage referring to the weight of the nutrient medium.

A pure laboratory culture can be obtained by sterile explantation of a natural fruiting body and by incubating the explantate on an agar slope. The pure culture grows on wort agar in the form of a white cotton-wool-like mycelium, which is asporogenic, forms clamps and branched and partitioned hyphae of 2–5$\mu$ thickness. Occasionally, the pure culture results in spontaneous formation of fruiting bodies which grow mostly to smaller sizes than in nature.

A deposit of the culture has been effected in September 1963 as number 85–27 in the Culture Collection of Basidiomycetes of the Institute of Microbiology of the Czechoslovak Academy of Sciences in Prague. The deposit has also been listed in the "List of Cultures of Basidiomycetes" (in English language) of which the first edition appeared in October 1964, and which is edited by the above-listed Institute. Further editions of the same list have been published in April 1965 and subsequently.

The following is a more specific description of a process for producing the antibiotic of the invention. First, an agar-slope culture is prepared for inoculating a nutrient medium in a flask. A liquid culture is thus grown which is used for inoculating the growth medium in an inoculation tank. The inoculum is then transferred to a fermentation medium which is contained in a production tank.

The basidiomycete *Oudemansiella mucida* can also be grown in a surface culture. Theoretically, the antibiotic could also be produced from the fungus obtained by field collection of wild-growing plants, but this type of approach would be little suited for industrial production. The preferred process is therefore the submersed aerobic cultivation.

As already indicated, the growth medium must contain a source of assimilable carbon and organic or inorganic nitrogen. Preferably, it contains mineral nutrient salts and traces of various metals such as occur as impurities in the other components of the growth medium. As a source of assimilable carbon there may be used lipids (plant or animal oils), various polyols, e.g. glycerol, assimilable carbohydrates, e.g. glucose, sucrose, fructose, maltose, dextrin, ordinary or soluble starch, soluble derivatives of cellulose and other water-soluble or at least partly soluble carbohydrates or carbohydrate-containing substances, such as molasses, wort, hydrol, etc. As a source of assimilable nitrogen, there may be used various compounds, such as amino acids or amino-acid-containing substances, e.g. casein (also hydrolyzed casein), fish flour, soybean meal, meat extracts, peptone, distillation solubles, yeast (also extracts or autolyzates), corn-steep liquor and other nitrogenous compounds of animal or plant origin. In addition, as sources of nitrogen, one can use various chemical compounds containing ammonium, amines, amides, nitrate or nitrite nitrogen. Preferably, various mineral salts, such as salts of sodium (e.g. chloride), calcium (e.g. carbonate), magnesium (e.g. sulfate), phosphates, etc., are added.

The pH of the fermentation medium before sterilization may be between 3 and 7 and preferably is between 5.5 and 6.0. The fermentation may be carried out at a temperature between 15 and 30° C. and preferably at a temperature between 18 and 25° C.

The development of the submerged culture is slower than with actinomycetes or with penicillia. Maximum growth is normally reached after 5–6 days. The fermentation is discontinued after 6–8 days, which is the period where the production of the antibiotic has reached its maximum. The pH values during fermentation are subject to change depending on the age of the culture and the concentration of the carbon source employed. With an initial pH of 5.5, a decrease to between 5.0 and 4.7 is observed during the first three days. There then follows a gradual rise to the final value between 6 and 7.5.

The antibiotic activity of samples taken during the fermentation rises only slowly during the first three or four days. Then a steep rise occurs to the final value of 10,000–70,000 fungicidin units/ml. The fermentation process then is discontinued.

The intensity of the aeration may be varied between 0.5 and 2 liters of air per litre of fermentation liquid per minute without in any way affecting the antibiotic production.

The general method of extraction is as follows:

The fermentation liquid or mycelium separated therefrom is subjected to extraction with an organic solvent. The solvent may be an aliphatic alcohol with 1–5 carbon atoms, an acetic acid ester of an aliphatic alcohol, an aliphatic or cycloaliphatic hydrocarbon having 6–10 carbon atoms, a chlorinated aliphatic hydrocarbon having 1–2 carbon atoms, an aromatic hydrocarbon having 6–7 carbon atoms, an aliphatic ketone having 3–7 carbon atoms, or a mixture of these solvents. Specific examples of suitable solvents are ethyl ether, ethanol, ethyl acetate or chloroform.

There is thus obtained a raw extract which then may be subjected to distillation, preferably in a vacuum. The residual solvent may thus be removed.

There is then obtained an oily concentrate which by itself has strong antifungal antibiotic properties, as will be discussed further below.

The pure antibiotic may then be isolated from the concentrate by chromatographic adsorption or separation on aluminum oxide or silica gel, by redistillation or by a combination of distillation and chromatographic separation.

About one-fifth of the antifungal antibiotic is found in solution in the fermentation medium. The larger part thereof, and up to about four-fifths, is bound to the mycelium.

More specifically, the isolation and recovery of the pure antibiotic involves the following steps. As indicated from the filtrate of the fermentation liquid there is first produced an extract by multiple extraction in a countercurrent extractor with a suitable water immiscible solvent of the type described above. Such extraction is preferably carried out at a pH of between 3.0 and 8.5. Normally the pH of the filtrate will be within this range thus not requiring any adjustment of the pH. Suitable and preferred solvents include butylacetate, chloroform, butanol and the like.

The antifungal antibiotic preferably is obtained from the filtered-off mycelium after drying the same in conventional manner by repeated extraction with an organic solvent preferably an ether, ester, chlorinated hydrocarbon, lower alcohol or aromatic hydrocarbon. The extraction may be carried out by stirring and sucking off of the extract, or preferably at somewhat elevated temperature in a suitable extraction device.

It is also possible, when carrying out the extraction of the mycelium with water miscible solvents to extract the mycelium in wet condition without prior drying.

Extraction of the mycelium by means of solvents which are immiscible with water and at elevated temperature is preferably carried out after previous dehydration of the wet mycelium by azeotropic distillation.

Upon evaporation of the extract obtained by any one of the above described methods, preferably under vacuum, the mentioned oily, generally brown-colored product is obtained which contains between about 15 and 20% of the active material, i.e. the antifungal antibiotic. Such vacuum evaporation preferably is carried out at a residual pressure of about 5 mm. Hg at a temperature of about 50° C.

The balance of the thus-obtained concentrate which contains between about 15 and 20% of the active antifungal antibiotic is composed of a mixture of other metabolites produced during the fermentation process simultaneously with the formation of the antifungal antibiotic, and the concentration of the antifungal antibiotic in the concentrate may be determined by the agar diffusion test utilizing Saccharomyces cerevisiae Sc–2/V as the testing microbe.

As indicated, it is possible to utilize the antifungal effect of the concentrated extract as such, or the pure or substantially pure antifungal antibiotic may be isolated by one or the other of the following procedures.

For this purpose the concentrate obtained by extraction of the mycelium and/or the fermentation liquid may be freed of a portion of the balast components therein and thus partially purified for instance by being dissolved in chloroform and the thus formed solution then diluted with petroleum ether. Upon allowing the thus formed solution to stand, a viscous dark oil will separate which when allowed to stand will further thicken. The total effective antifungal agent remains in the solution.

Partial purification of the crude extract also can be achieved by shaking the crude extract with water in an amount equal to about 15% of the volume of the extract, whereby the suspension which is formed upon standing for about 18 hours will nearly solidify at ambient temperature. The thus precipitated balasts or inactive substances may be sucked off and in this manner a slightly yellowish concentrate of increased purity will be obtained.

The appropriately concentrated solution of the extract, that is the oily concentrate, can be used directly for external application against various skin mycoses. The composition in this type of application does not have any secondary or toxic effects. The oily concentrate is fairly heat-stable. Its antibiotic activity does not decrease even after being maintained for 30 minutes at a temperature of 100° C. The solution of the concentrate in ethyl ether or another suitable organic solvent has the specific absorption peaks in the ultraviolet region at 205, 211, 223, 229, 237, 284, 292, 299 and 312 m$\mu$ ($\pm 1$ m$\mu$). This absorption spectrum, with the exception of the peak at 205 m$\mu$ is characteristic for an antibiotic preparation purified by column chromatography, too; it indicates that the antibiotic of the invention is actually present in the concentrate. In contrast to the polyacetylene antibiotics produced by some other basidiomycetes the concentrate is not labil nor highly toxic. It is active even against microorganisms which are resistant to fungicidin or other antifungal antibiotics of the polyene type and also against those resistant to griseofulvin. The antibiotic in the form of the concentrate is active as such against most fungi, including Dermatophytes, Phycomycetes, Fungi Imperfecti and Ascomycetes, and is inactive toward bacteria.

FIG. 1a illustrates a typical chromatogram of the raw concentrate on a thin layer of $Al_2O_3$ (8 x 18 cm.) in a system of petroleum ether-ether-acetic acid in the ratio 90:10:1 and with rising development.

The full lines indicate zones visible in ultraviolet light, the dashed lines indicate zones of the trace elements, and the hatched part indicates the zone of the antibiotic, which zone is identified by reference numeral 3. This zone manifests itself by a specific dark fluorescence and becomes more distinct upon being spray with an ammoniacal solution of silver nitrate and heating for 5 minutes at 80° C., due to the formation of reduced silver.

Figure 1B:
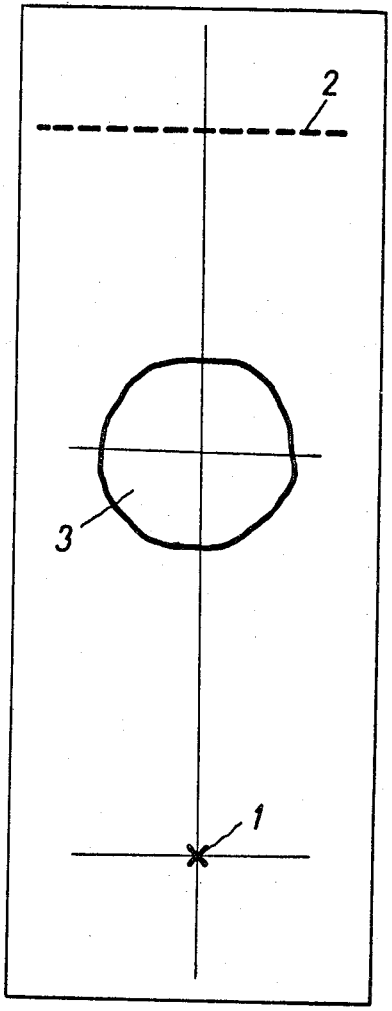
FIG. 1b shows the chromatogram after interlayering with agar medium inocculated with *Saccharomyces cerevisiae* and incubation.

After interlayering the chromatogram with agar medium inoculated with Saccharomyces cerevisiae and incubation, as shown in FIG. 1b, in the place of the antibiotic zone, a clear zone of growth inhibition of the test microbe is formed.

In FIGS. 1a and 1b reference numeral 1 indicates the point at which the sample is applied to the chromatogram and reference numeral 2 indicates the front-line reached by the developing system.

Regarding the process for recovering the pure antibiotic, the preferred process as already indicated is to obtain the antibiotic directly from the crude concentrate by chromatographic separation on a column with aluminum oxide, silica gel or other adsorbents.

The column may be developed with a suitable solvent such as petroleum ether, benzene, ether, chloroform or a mixture thereof. The course of chromatographic process can be easily controlled by observing the column under UV light. The active compound, in contrast to the inactive accompanying products, has a specific dark fluorescence (extinction). The chromatographic separation can also be easily controlled by the before mentioned thin layer chromatography with detection in UV light, utilizing ammoniacal silver nitrate. If desired, chromatographic purification may be repeated. Provided that the chromatographic separation has been properly carried out and the effective agent thus separated from balast material, the fraction containing the effective agen is then subjected to careful evaporation of the solvent and thereby the antifungal antibiotic may be obtained in crystallized form.

Furthermore, it has been found that by distilling the crude concentrate under sufficiently high degree of vacuum at an adequate temperature, it is possible to obtain a residue without substantial loss of biological effectiveness. By carrying out the distillation at a residual pressure of between about 0.01 and 0.005 mm. Hg, it is possible to distill off about 75% of the crude concentrate. If desired after redistillation, the distillate obtained in this manner may be subjected to crystallization by inoculation of the same with crystals of the pure antifungal antibiotic.

The pure antibiotic obtained in this manner has the following characteristics: The pure antibiotic is a white, crystalline material of neutral character, has a melting point between 51 and 53° C., is soluble in most of the organic solvents and slightly soluble in water. The optical activity is $+3.3°$ ($c$ 10 at 546 m$\mu$ in benzene). The pure antifungal antibiotic gives characteristic UV and IR spectra.

Figure 2:
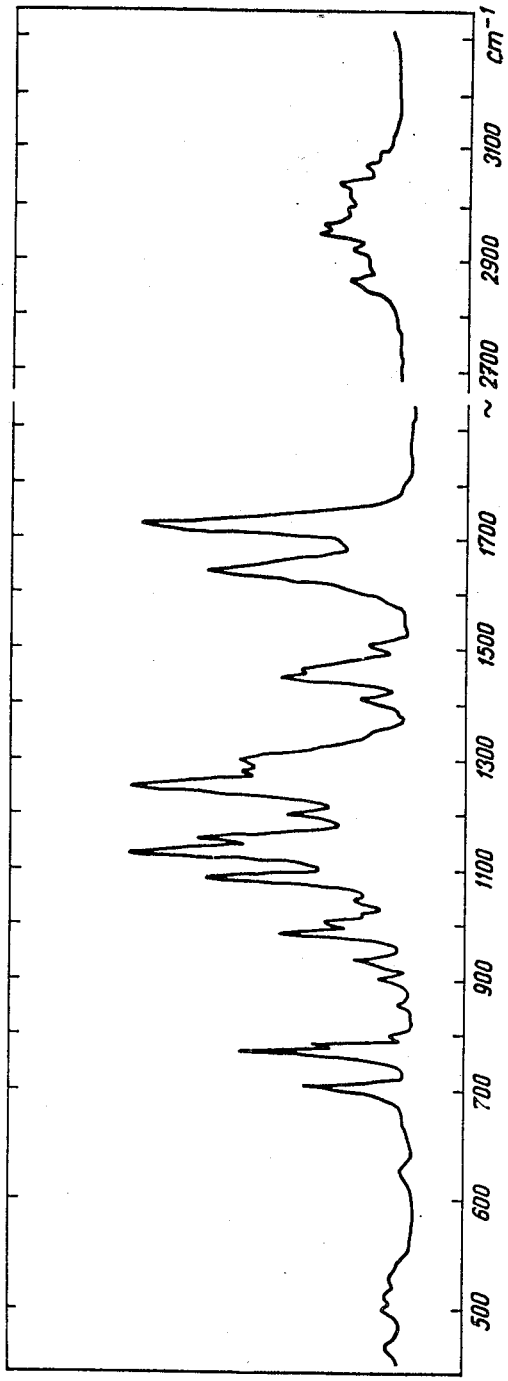
FIG. 2 is the infrared spectrum of the pure antibiotic (in potassium bromide)
Figure 3:
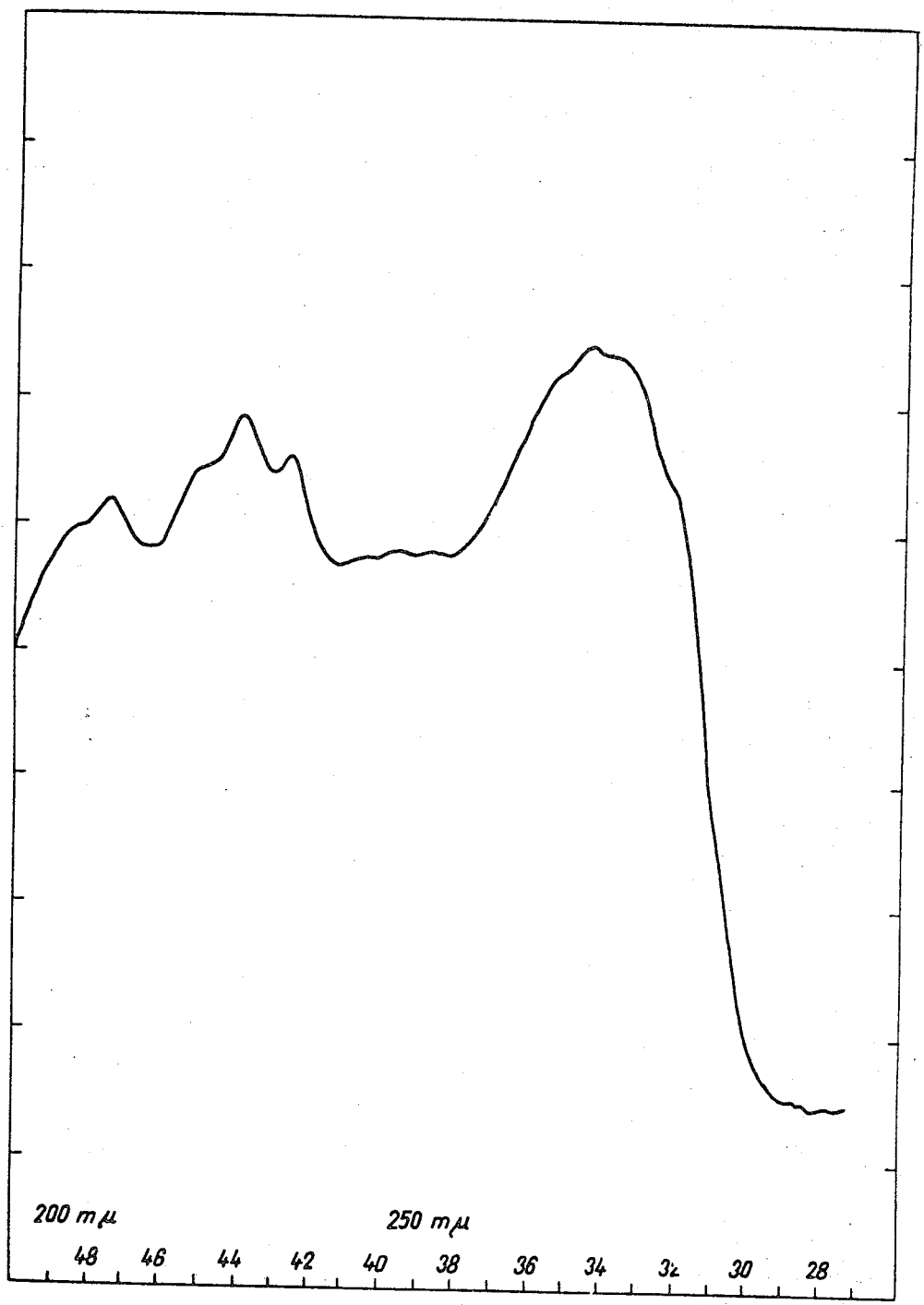
FIG. 3 is the ultraviolet spectrum of the pure antibiotic (in methanol).

FIG. 2 shows the IR spectrum of the pure antibiotic KBr and FIG. 3 shows the UV spectrum of the pure antibiotic methanol.

The antifungal antiobtic contains carbon, hydrogen and oxygen. The molecular weight as established by mass spectography is 258. Elementary analysis indicates 73.92% carbon, 7.26% hydrogen and 18.28% oxygen which indicates a composition corresponding to the empirical formula $C_{16}H_{18}O_3$. The antifungal antibiotic is highly stable and may be distilled under a high degree of vacuum. Its effectiveness is not affected by prolonged storage at temperatures of between 4 and 30° C.

The pure antifungal antibiotic is effective against a large number of fungi, including Dermatophytes, Phycomycetes, Fungi Imperfecti and Ascomycetes, but it is completely inactive against bacteria.

As will be shown in the table below, the specific antifungal activity of the pure antibiotic substance has been tested with respect to a great number of microorganisms. These tests were carried out in the following manner:

Discs of filter paper having a diameter of 6 mm. were soaked in solutions of varying concentration of the antifungal antibiotic in a mixture of equal proportions of ethanol and ether and, after evaporation of the solvent, the thus impregnated discs were placed on the surface of an agar nutrient medium which had been inoculated with the respective microorganism with respect to which the effectiveness of the antifungal antibiotic was to be tested. After incubation at suitable temperature, the appearance or lack of appearance of inhibition zones was determined.

TABLE 1.—ANTIFUNGAL EFFECT OF THE PURE ANTIBIOTIC SUBSTANCE

| Microorganism: | Minimum concentration of the antifungal antibiotic required for causing inhibition (µg./ml.) |
|---|---|
| Candida albicans | 10 |
| Candida tropicalis | 10 |
| Candida pseudotropicalis | 10 |
| Candida parapsilopsis | 10 |
| Candida zeilano | 10 |
| Candida guillermondi | 10 |
| Candida crusei | 10 |
| Aspergillus niger | 10 |
| Aspergillus oryzae | 10 |
| Aspergillus fumigatus | 10 |
| Penicillium sp. | 100 |
| Mucor sp. | 100 |
| Saccharomyces cerevisiae | 1 |
| Geotrichum sp. | 0 |
| Trichophyton rubrum | 300 |
| Trichophyton mentagrophytes | 100 |
| Trichophyton astero | 10 |
| Trichophyton rosaceum | 100 |
| Microsporum canis | 300 |
| Sporotrichum schenckii | 200 |
| Coccidioides immitis | 100 |
| Blastomyces dermatitis | 100 |
| Torula utilis | 100 |

The toxicity of the antifungal antibiotic agent upon intraperitoneal application of a 1% aqueous suspension, in the case of mice is 250 mg./kg. of body weight and upon application per os, 500 mg./kg.

Intramuscular or external application of the antifungal antibiotic to rabbits did not indicate an absorption of the antibiotic into the blood stream. Blood taken 2 and 5 hours after intramuscular or external application by cardial puncture did not even show traces of an antibiotic activity of the serum. Testing of the serum was carried out by the agar diffusion technique, utilizing *Saccharomyces cerevisiae* Sc-2/V as the test microbe.

Upon application of the antifungal antibiotic to the skin and the conjunctival sac of rabbits no irritation was caused.

By its properties, the antifungal antibiotic which is isolated according to the present invention is best suited for external application in the form of an ointment or a spray.

Of the following examples, Examples 1–18 illustrate the fermentation part of the process Examples 9–13 the preparation of the crude oily concentrate and Examples 14–16 the isolation of the pure antifungal antibiotic.

In the following examples the activity of the antibiotic produced was determined by plate diffusion microbiological titration with the strain *Candida albicans* SZU, using fungicidin as reference standard and is expressed in fungicidin units/ml. fermentation medium.

EXAMPLE 1

A block of mycelial tissue was explanted from a natural fruiting body of the basdidiomycete *Oudemansiella mucida*, using a sterile scalpel. It was transferred to a test tube with wort agar slant, and incubated at 20 to 25° C. After growth, the mycelial culture was reinoculated into tubes with wort agar slants. After 10 days of growth, the cultures were maintained in a refrigerator at +4° C. for use as inoculum in inoculation flasks or for further inoculations on solid agar media.

EXAMPLE 2

28 l. of the following fermentation medium were placed into a 50-liter fermentor:

| | Percent |
|---|---|
| Glucose | 3 |
| Corn-steep liquor (50% dry weight) | 1.5 |
| Crystalline magnesium sulfate | 0.15 |

The pH was adjusted to 5.5 and sterilization performed for 60 minutes in circulating steam and for 60 minutes at 120° C. After cooling to 23° C., the fermentor was inoculated with a total of 1200 ml. submerged culture of Oudemansiella mucida from three 2-liter Ehrlenmeyer flasks each containing 400 ml. of the same medium, incubated previously for 120 hours on a reciprocating shaker. The culture in the inoculation tank was aerated with 0.7 volume of air per volume of fermentation medium per minute and stirred for 96 hours. It was then used for inoculating the production fermentation tank of 1000 liter capacity, containing 700 liters of the following medium:

| | Percent |
|---|---|
| Glucose | 5 |
| Corn-steep liquor (50% dry weight) | 2 |
| Crystalline magnesium sulfate | 0.15 |

The pH was adjusted before sterilization to 5.5. Fermentation proceeded for 168 h. at 23±1° C., at an aeration intensity of 0.7 volume of air/volume of medium/min. and at 400 stirrer revolutions/min. After an early drop of pH to 4.7 a rise to 6.4 followed. The final antibiotic activity of the fermentation medium was 58,000 fungicidin units/ml.

EXAMPLE 3

A 1000 liter production fermentor was filled with 700 liters of the following medium:

| | Percent |
|---|---|
| Glucose | 2 |
| Soybean meal | 3 |
| Molasses | 0.6 |

The pH value was adjusted before sterilization to 5.5. Sterilization, inoculation and cultivation proceeded as in Example 2. After 144 h. the antibiotic titer reached a value of 65,000 fungicidin units/ml.

EXAMPLE 4

A 1000 liter production fermentor was filled with 700 liters of the following medium:

| | Percent |
|---|---|
| Glucose | 6 |
| Corn-steep liquor (50% dry weight) | 1 |
| Ammonium nitrate | 0.2 |
| Crystalline magnesium sulfate | 0.15 |

The pH was adjusted to 5.5 before sterilization. Sterilization, inoculation and cultivation proceed as in Example 2. After 144 h. the antibiotic titer reached 70,000 fungicidin units/ml.

EXAMPLE 5

A 1000-liter fermentor was filled with 70 liters of the following medium:

| | Percent |
|---|---|
| Sucrose | 2 |
| Soluble starch | 1 |
| Dextrin | 1 |
| Distillation solubles | 10.5 |
| Secondary ammonium phosphate | 0.2 |
| Crystalline magnesium sulfate | 0.15 |
| Sodium chloride | 0.2 |
| Calcium carbonate | 0.2 |

The pH was adjusted to 5.5 before sterilization. Sterilization, inoculation and cultivation proceeded as in Example 2. After 168 h. an antibiotic titer of 60,000 fungicidin units/ml. was reached.

EXAMPLE 6

Fermentation was effected as in Example 5 but the sucrose was replaced by 2% glycerol. Under these conditions the antibiotic titer reached 56,000 fungicidin units/ml.

EXAMPLE 7

A 1000-liter fermentor was filled with 700 liters of the following medium:

|  | Percent |
|---|---|
| Glucose | 3 |
| Asparagine | 0.25 |
| Alanine | 0.01 |
| Ammonium tartrate | 0.05 |
| $KH_2PO_4$ | 0.1 |
| $MgSO_4$ | 0.05 |
| $CaCl_2$ (anhydrous) | 0.025 |
| NaCl | 0.001 |

Traces of $Zn^{2+}$, $Mn^{2+}$, $Fe^{2+}$ or $Fe^{3+}$, $Cu^{2+}$, $H_3BO_3$, KI, $Co^{2+}$, vitamin $B_1$, $B_2$, $B_6$, incotinamide, calcium pantothenate. The pH was adjusted to 5.8. Sterilization, inoculation and cultivation proceeded as in Example 2. After 144 h. the fermentation liquor contained an antibiotic activity of 15,000 fungicidin units/ml.

EXAMPLE 8

Fermentation was performed as in Example 7 but asparagine was replaced with glutamic acid and alanine with glycine. Under these conditions, the antibiotic activity of the fermentation liquor after 144 h. was 14,600 fungicidin units/ml.

EXAMPLE 9

2400 liters of the filtered liquid obtained in the submerse fermentation of a culture of basidiomycete *Oudemansiella mucida* (Schrad. ex Fr.) Höhn were extracted with butyl acetate in a countercurrent extractor at the ratio of filtered medium to butyl acetate of 1:5. The pH of the filtered medium was 6.5 and thus no adjustment of the pH was required.

The thus obtained clear extract was thickened in a film evaporator at a maximum temperature of 60° C. to a volume of about 40 liters. Further processing was carried out by evaporation of the residual solvent in a rotary vacuum evaporator.

In this manner 670 grams of a raw oily concentrate of the antifungal antibiotic was obtained.

EXAMPLE 10

By filtration of 2400 liters of fermented medium in a rotary filter, 121 kg. of wet mycelium were separated. The separated wet mycelium was dried in a vacuum dryer at a maximum temperature of 55° C., and in this manner 23.5 kg. of dry mycelium were obtained.

The dry mycelium was finely ground and extracted by stirring for 1 hour in 35 liters chloroform followed by filtration. The extraction of the filtered-off ground mycelium was repeated five times. The combined 5 chloroform extracts were evaporated in a glass circulatory evaporator at a maximum temperature of 30° C. and the rest of the solvent was removed by evaporation in a glass rotary evaporator. In this manner, 2136 grams of crude oily concentrate of the antifungal antibiotic was obtained and found to have an effectiveness of 480,000 units per gram.

EXAMPLE 11

10 kg.. of the wet mycelium were soaked in trichloroethylene and, under constant stirring, the water was distilled off under azeotropic conditions and the organic fraction of the distillate recycled to the mycelium-trichloroethylene mixture.

After drying of the thus treated mycelium, extraction thereof was repeated several times with trichloroethylene in the manner described in Example 10. The combined extracts were thickened under vacuum in a circulatory rotary evaporator and, in this manner, 1072 grams of crude oily concentrate of the antifungal antibiotic was obtained with an effectiveness of 520,000 units per gram. The thickening was carried out at a residual pressure of 5 mm. Hg and at a temperature of 50° C.

EXAMPLE 12

8.5 kg. of dry mycelium obtained by lyophilisation were extracted in a Soxhlet apparatus with ether whereby the solvent was changed six to seven times in the extraction part of the apparatus. After combining the extracts and distilling off the ether, 1050 grams of the crude oily antifungal antiobiotic concentrate were obtained and found to have an effectiveness of 1,750,000 units per gram.

EXAMPLE 13

11.2 kg. of wet mycelium obtained by filtration of the above-described fermented medium were suspended in 25 liters of methanol and heated under stirring to 40° C. followed by sucking off of the thus extracted mycelium. The sucked off mycelium was again suspended in 25 l. methanol, heated and filtered, and this extraction was repeated twice.

The combined methanol filtrates or extracts were thickened in a circulatory vacuum evaporator and the residue obtained thereby was extracted twice with 20 liters petroleum ether, respectively. By separating the petroleum ether layers and distilling off the solvent portion thereof, 1135 grams of an oily concentrate of the antifungal antibiotic were obtained.

EXAMPLE 14

160 grams of the oily concentrate obtained according to the preceding examples were dissolved in 500 ml. of petroleum ether and introduced into a column of 1.7 kg. of aluminum oxide (activity II). The column dimensions were 64 x 6 cm.

After soaking into the column, 3000 ml. petroleum ether were used for development. Thereby a sufficient separation of the antifungal antibiotic substance from the accompanying metabolites, a part of which had already passed into the eluate, was obtained. The ballast substances in the eluate displayed a blue and violet fluorescence. The identification and detection of the individual zones was carried out in UV light. The active substance formed a layer having a height of 30 cm., located in the center of the column. After displacement of the absorbent from the column the active layer was mechanically separated and, after drying, eluated with 3 liters of chloroform. By concentrating of this extract, 32.5 grams of a light-yellow oil were obtained which became highly viscous upon cooling and had an activity of 4,325,000 units per gram.

By control-chromatography on a thin layer of silica gel, it was determined in a system of petroleum ether-ether-acetic acid of the ratio 90:10:1 that the thus obtained antifungal antibiotic still contained very small quantities of accompanying materials or impurities. Upon inoculation of the oil with crystals of the pure antibiotic, it was possible to crystallize the antibiotic fraction of the oil over a period of about 3 days. After pouring cooled petroleum ether over the crystal mass, sucking off and washing with cool petroleum ether, the antifungal antibiotic was obtained in the form of white crystals having a melting point of between 49 and 51° C.

EXAMPLE 15

The same results as were obtained in Example 14 were also obtained by using silica gel as adsorbent and developing with a mixture of petroleum ether-ether according to the ratio 9:1, with a rate of adsorbent:antifungal antibiotic of 20:1.

EXAMPLE 16

500 grams of the oily concentrate produced by the extraction methods described in Examples 9–13 were distilled in a Hickmann flask at a pressure of 0.01 mm. Hg by heating in a Wood metal bath. Within the temperature range of between 70 and 187° C., a total of 231 grams of a pure yellow oil were distilled off. The antifungal antibiotic substance was contained in the fraction distilling between 120 and 140° C. Further distillation beyond the temperature of 187° C. could not be carried out due to progressive decomposition of the residue in the distillation flask. The thus-obtained fraction of effective antifungal antibiotic was shown upon control chromatography carried out as described in Example 6, still to contain a small proportion of various contaminants. By repeated high vacuum distillation and collection of the fraction distilling between 128 and 132° C., a clear light yellow distillate of the practically pure antifungal antibiotic substance was obtained which contained only traces of material showing blue fluorescence. The yield of the practically pure antifungal antibiotic obtained in this manner was 54 grams.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An antifungal antibiotic obtained by fermentation of a culture of basidiomycete *Oudemansiella mucida* (Schrad. ex. Fr.) Höhn, the said antibiotic having the following characteristics:

empirical formula: $C_{16}H_{18}O_3$
   molecular weight (established by mass spectrography): 258
   melting point: 51 to 53° C.
   optical activity: $+3.3°$ ($c$ 10 at 546 m$\mu$ in benzene)
   infrared and ultraviolet spectra: as shown in FIGS. 2 and 3.
   most significant absorption peaks.—IR region: 695, 752, 768, 971, 1075, 1117, 1146, 1242, 1437, 1458, 1623, 1713 cm.$^{-1}$. UV region: 211, 229, 237, 292 m$\mu$ 2. The method of producing the antifungal antibiotic of claim 1, comprising subjecting a culture of basidiomycete *Oudemansiella mucida* (Schrad. ex. Fr.) Höhn to fermentation in a liquid fermentation medium containing sources of assimilable carbon and nitrogen at a temperature between 15 and 30° C. and a pH between 3 and 7, extracting the fermented mass with an organic solvent in which the antifungal antibiotic is soluble, removing the solvent by evaporation and recovering the antibiotic from the concentrate by chromatographic methods, distillation or a combination of both steps in succession.

3. The process of claim 2, wherein the fermentation is carried out at a temperature between 18 and 25° C.

4. The process of claim 2, wherein the fermentation is carried out at a pH between 5.5 and 6.0.

5. The process of claim 2, wherein nutrient salts are present in the fermentation medium, said salts being selected from the group consisting of chlorides, sulfates, phosphates, iodides, borates and carbonates of calcium, sodium, potassium, magnesium, zinc, copper, cobalt, manganese, ferric iron and ferrous iron.

6. The process of claim 2, wherein the fermentation is carried out as an aerobic submerged fermentation.

7. The process of claim 2, wherein the concentration of sources of assimilable carbon and nitrogen is up to 15% by weight relative to the weight of the fermentation medium.

8. The process of claim 2, wherein the sources of assimilable carbon and nitrogen are selected from the group consisting of carbohydrates, lipids, polyols, amino acids, ammonium salts, nitrates and raw materials containing such compounds.

9. The process of producing the antifungal antibiotic of claim 1, comprising subjecting a culture of basidiomycete *Oudemansiella mucida* (Schrad. ex. Fr.) Höhn to fermentation in a liquid fermentation medium containing sources of assimilable carbon and nitrogen at a temperature between 15 and 30° C. and a pH between 3 and 7, then subjecting the fermented mass to lyophilization, thereafter extracting the resulting dry material with an organic solvent in which the antifungal antibiotic is soluble, then removing the solvent by evaporation and recovering the antibiotic from the concentrate by chromatographic methods, distillation, or both steps in succession.

10. The process of producing the antifungal antibiotic of claim 1, comprising subjecting a culture of basidiomycete *Oudemansiella mucide* (Schrad. ex Fr.) Höhn to fermentation in a liquid fermentation medium containing sources of assimilable carbon and nitrogen at a temperature between 15 and 30° C. and a pH between 3 and 7, then subjecting the fermented mass to filtration, suspending the obtained wet mycelium in a solvent therefor, extracting the suspended mycelium, concentrating the extract and recovering the antibiotic from the concentrate by chromatographic methods, distillation, or both steps in succession.

11. A crude oily concentrate having antifungal and antibiotic properties and containing the antibiotic of claim 1, the said oily concentrate being characterized by absorption peaks in the ultraviolet region (in ethyl ether) at 205, 211, 223, 229, 237, 284, 292, 299 and 312 m$\mu$ ($\pm 1$ m$\mu$) and being obtained by subjecting a culture of basidomycete *Oudemansiella mucida* (Schrad. ex Fr.) Höhn to fermentation in a liquid fermentation medium containing sources of assimilable carbon and nitrogen at a temperature between 15 and 30° C. and a pH between 3 and 7, extracting the mycelium separated from the fermentation mash, or extracting the whole fermentation mash, with an organic solvent in which the antibiotic is soluble and concentrating the extract thus obtained by evaporating at least part of said solvent at a reduced pressure until a crude oily concentrate is formed.

References Cited

UNITED STATES PATENTS 3,156,618  11/1964  Oku et al. _____ 424—122

SAM ROSEN, Primary Examiner

U.S. Cl. X.R.

195—80, 81